(12) United States Patent
Masny et al.

(10) Patent No.: US 11,601,407 B2
(45) Date of Patent: Mar. 7, 2023

(54) FAST OBLIVIOUS TRANSFERS

(71) Applicant: Visa International Service Association, San Francisco, CA (US)

(72) Inventors: Daniel Siegfried Werner Masny, Palo Alto, CA (US); Peter Byerley Rindal, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/510,235

(22) Filed: Oct. 25, 2021

(65) Prior Publication Data

US 2022/0045994 A1 Feb. 10, 2022

Related U.S. Application Data

(62) Division of application No. 16/434,338, filed on Jun. 7, 2019, now Pat. No. 11,190,496.

(60) Provisional application No. 62/804,435, filed on Feb. 12, 2019.

(51) Int. Cl.
| | | |
|---|---|---|
| *H04L 29/06* | (2006.01) | |
| *H04L 9/40* | (2022.01) | |
| *H04L 9/30* | (2006.01) | |
| *H04L 9/32* | (2006.01) | |

(Continued)

(52) U.S. Cl.
CPC ........ *H04L 63/0428* (2013.01); *H04L 9/0819* (2013.01); *H04L 9/0869* (2013.01); *H04L 9/14* (2013.01); *H04L 9/3073* (2013.01); *H04L 9/3242* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 2004/0158715 A1 | 8/2004 | Peyravian et al. | |
| 2005/0259817 A1* | 11/2005 | Ramzan ............... | H04L 9/3013 380/46 |
| 2008/0123850 A1 | 5/2008 | Bhatnagar et al. | |

(Continued)

FOREIGN PATENT DOCUMENTS

| | | |
|---|---|---|
| CN | 106797311 | 5/2017 |
| CN | 107251476 | 10/2017 |

(Continued)

OTHER PUBLICATIONS

U.S. Appl. No. 16/434,338, Notice of Allowance, dated Jul. 23, 2021, 15 pages.

(Continued)

*Primary Examiner* — Bradley W Holder
(74) *Attorney, Agent, or Firm* — Kilpatrick Townsend & Stockton LLP

(57) ABSTRACT

Systems, methods, and computing device readable media for implementing fast oblivious transfer between two computing devices may improve data security and computational efficiency. The various aspects may use random oracles with or without key agreements to improve the security of oblivious transfer key exchanges. Some techniques may include public/private key strategies for oblivious transfer, while other techniques may use key agreements to achieve simultaneous and efficient cryptographic key exchange.

20 Claims, 10 Drawing Sheets

(51) Int. Cl.
*H04L 9/08* (2006.01)
*H04L 9/14* (2006.01)

(56) References Cited

U.S. PATENT DOCUMENTS

| | | |
|---|---|---|
| 2011/0154056 A1 | 6/2011 | Spalka et al. |
| 2011/0164746 A1 | 7/2011 | Nice et al. |
| 2012/0063593 A1* | 3/2012 | Camenisch .......... H04L 9/3218 380/44 |
| 2014/0040614 A1 | 2/2014 | Kolesnikov et al. |
| 2014/0122888 A1 | 5/2014 | Yoon et al. |
| 2017/0147835 A1* | 5/2017 | Bacon .................. H04L 9/008 |
| 2017/0317823 A1 | 11/2017 | Gandhi et al. |
| 2018/0287788 A1* | 10/2018 | Pitalúa ................. H04L 1/0618 |

FOREIGN PATENT DOCUMENTS

| | | |
|---|---|---|
| CN | 108292402 | 7/2018 |
| WO | 2016209939 | 12/2016 |

OTHER PUBLICATIONS

Barreto et al., "A Framework for Efficient Adaptively Secure Composable Oblivious Transfer in the ROM", Accessed from Internet on Oct. 23, 2017, 29 pages.
Bellare et al., "Non-Interactive Oblivious Transfer and Applications", MIT Laboratory for Computer Science, 1990, pp. 547-557.
Chou et al., "The Simplest Protocol for Oblivious Transfer", 2015, 12 pages.
Friolo et al., "A Black-Box Construction of Fully-Simulatable, Round-Optimal Oblivious Transfer from Strongly Uniform Key Agreement", 36 pages.
Garg et al., "Two-Round MPC: Information-Theoretic and Black-Box", 2018, 60 pages.
Masny et al., "Time-Bounded A", Dec. 20, 2018, 5 pages.
Naor et al., "Efficient Oblivious Transfer Protocols", 2001, 10 pages.
Application No. PCT/US2019/037318, International Preliminary Report on Patentability, dated Aug. 26, 2021, 7 pages.
Application No. PCT/US2019/037318, International Search Report and Written Opinion, dated Nov. 7, 2019, 10 pages.
Peikert et al., "A Framework for Efficient and Composable Oblivious Transfer", Jan. 23, 2019, 28 pages.
Application No. CN201980091843.8, Office Action, dated Dec. 6, 2021, 13 pages.
Application No. EP19915423.8, Extended European Search Report, dated Mar. 10, 2022, 9 pages.
Application No. SG11202108409W, Notice of Decision to Grant, dated Apr. 11, 2022, 7 pages.
Application No. CN201980091843.8, Office Action, dated Sep. 21, 2022, 9 pages.

* cited by examiner

FAST OBLIVIOUS TRANSFERS

CROSS-REFERENCE TO RELATED APPLICATIONS

This application is a divisional application of U.S. patent application Ser. No. 16/434,338, entitled "Fast Oblivious Transfers" and filed on Jun. 7, 2019, which claims priority to U.S. Provisional Patent Application No. 62/804,435, entitled "Fast-Oblivious Transfers" and filed on Feb. 12, 2019, which is hereby incorporated by reference in its entirety for all purposes.

TECHNICAL FIELD

The present disclosure relates generally to secure transfers between computing devices. More specifically, but not by way of limitation, this disclosure relates to performing multiple-party computations that are secure, non-traceable, and authenticatable.

BACKGROUND

In general secure multi-party computation can be described as a joint computation between multiple parties, in which each party has some sensitive data and in the end every party learns the outcome of the computation, but nothing about the sensitive data of the other parties. Oblivious Transfer is an important building block for accomplishing secure multi-party computation.

Ensuring secure joint computation between computing devices continues to be a concern. For instance, a first party may wish to utilize data from a second party that is willing to provide some data, but unwilling to divulge information about the size and content of the overall data pool. If intercepted, the data could be used to obtain information about the data pools of the computing devices or used for illicit purposes. However, enabling a sender and receiver to share data without providing either party with information about the specific data being shared at any given point in time, can be problematic because some information about data being requested may be needed in order to fulfill a request. Conducting secure, non-traceable, and authenticatable transfers between computing devices can pose a challenge.

Aspects of the present invention address these and other problems individually and collectively.

BRIEF SUMMARY

Aspects of the invention are directed to fast oblivious transfer. Implementations support multi-party computation to encrypt data such as software applications and files, without parties to the computation having knowledge of the encryption scheme. The fast-oblivious transfers described herein may be secure, non-traceable, and capable of being authenticated.

One aspect of the invention is directed to a method comprising: storing an input value b that is to be used in executing an encrypted program, generating a first value $r_{1-b}$ using a random number generator, generating a key pair comprising a private key and a public key, using a cryptographic function, generating a hash output using a hash function that corresponds to the cryptographic function, generating a second value $r_b$ using the public key and the hash output, sending the first value $r_{1-b}$ and the second value $r_b$ to a sender device, receiving a cryptographic value c from the sender device, wherein the cryptographic value c is generated using the cryptographic function, generating, using the private key and the cryptographic function, a key value that corresponds to input value b, receiving the encrypted program from the sender device, executing the encrypted program using the key value to obtain an encrypted output value; and sending the encrypted output value to the sender device, wherein the sender device decrypts the encrypted output value using the key value.

Additional aspects are directed to a receiver device comprising a processor, and a computing device readable medium. The computing device readable medium comprises code, executable by the processor, configured or programmed to perform the above-noted method.

Another aspect of the invention is directed to a method comprising: storing a first key $k_0$ and a second key $k_1$, receiving a first value $r_0$ and a second value $r_1$ from a receiver device, generating a first public key using the first value $r_0$ and a first hash output by operating a hash function H on the second value $r_1$, wherein the hash function H correspond to a cryptographic function used by the receiver device to generate the first value $r_0$ and the second value $r_1$, generating a second public key using the second value $r_1$ and a second hash output by operating the hash function H on the first value $r_0$, generating a first cryptographic value $c_0$ by operating the cryptographic function on the first public key and the first key $k_0$, generating a second cryptographic value $c_1$ by operating the cryptographic function on the second public key and the second key $k_1$, sending the first cryptographic value $c_0$ and the second cryptographic value $c_1$ to the receiver device, sending an encrypted program to the receiver device, wherein the receiver device executes the encrypted program to generate an encrypted output value, receiving the encrypted output value, and decrypting the encrypted output value using a corresponding key.

Another aspect of the invention is directed to a method including generating a first private key d using a random number generator, generating a first public key c using a cryptographic function, sending the first public key c to a receiver device, receiving a first value $r_0$ and a second value $r_1$ from a receiver device, generating a first key $k_0$ using the first value $r_0$ and a first hash output by operating a hash function H on the second value $r_1$ to obtain a first intermediate result, wherein the cryptographic function operates on the first intermediate result using the first private key d to generate the first key $k_0$, wherein the hash function H corresponds to the cryptographic function, generating a second key $k_1$ using the second value $r_1$ and a second hash output by operating the hash function H on the first value $r_0$ to obtain a second intermediate result, wherein the cryptographic function operates on the second intermediate result using the first private key d to generate the second key $k_1$, sending an encrypted program to the receiver device, wherein the receiver device executes the encrypted program to generate an encrypted output value, receiving the encrypted output value, and decrypting the encrypted output value using a corresponding key.

Additional aspects are directed to a sender device comprising a processor, and a computing device readable medium. The computing device readable medium comprises code, executable by the processor, configured or programmed to perform the above-noted method.

Further details regarding aspects of the invention can be found in the Detailed Description and the Figures.

Figure 1:
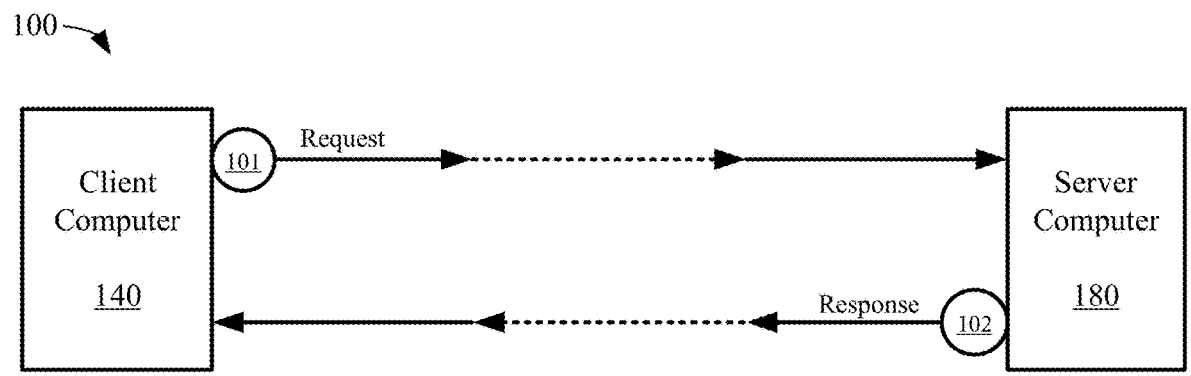
FIG. 1 shows a simplified message flow diagram illustrating secure communications between a client computing device and a server computing device, in accordance with some aspects.

In the drawings, dotted or dashed lines may be used to indicate organizational structure, to indicate that an element is optional, or to indicate that data or information is passed through an element substantially unchanged. Arrows may be used to indicate the flow of data or information between two or more elements. Circles having reference numbers may indicate that certain steps are performed by an adjacent element.

Terms

Prior to discussing aspects of the invention, some terms can be described in further detail.

The term "server computing device" may include a computing device or cluster of computing devices. For example, the server computing device can be a large mainframe, a minicomputing device cluster, or a group of servers functioning as a unit. In one example, the server computing device may be a database server coupled to a Web server. The server computing device may be coupled to a database and may include any hardware, software, other logic, or combination of the preceding for servicing the requests from one or more client computing devices. The server computing device may comprise one or more computational apparatuses and may use any of a variety of computing structures, arrangements, and compilations for servicing the requests from one or more client computing devices.

The term "public/private key pair" may include a pair of linked cryptographic keys generated by an entity (e.g., a computing device or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on elliptic curve cryptography (ECC), lattice or code based cryptosystems such as McEliece or learning with errors (LWE) which may be post-quantum secure.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. For example, a first computing device may generate a first key pair include a first public key and a first private key. A second computing device may generate a second key pair including a second public key and a second private key. The first computing device may generate a shared secret using the second public key of the second computing device and the first private key of the first computing device. The second computing device may generate the same shared secret using the first public key of the first computing device and the second private key of the second computing device. The first computing device and the second computing device may both use the shared secret to generate a session key.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

"Forward secrecy" is a characteristic of secure communications that refers to the ability of the messages to not be decrypted if the private keys of the sender and/or the receiver of the messages are later compromised. "Perfect forward secrecy" is a characteristic of secure communications that refers to the ability of the messages to not be decrypted if the private keys of both the sender and the receiver of the messages are later compromised. In one scenario, the private keys may be obtained by a third party that gains physical access to the computing devices. In another scenario, a third computing device can spend a long enough time to crack the private key, which would be impractical but not impossible. However, secure communications having "perfect forward secrecy" cannot be decrypted even if the static private keys of the sending and receiving computing devices are both compromised. One way to achieve "perfect forward secrecy" is by not encrypting the messages using static private keys. Accordingly, if the static private keys are compromised, they cannot be used to decrypt the messages. In one example, an encryption key pair can be randomly generated for the key exchange and then deleted (e.g., zeroized) shortly thereafter. Accordingly, the private key cannot be obtained if a third party later gains physical access to the computing device. Therefore, communications sent in the past maintain their secrecy going forward. Furthermore, even if one message is compromised, the other messages are not compromised because there is no single key used for encryption across different messages.

A "random oracle" responds to every unique query with a random response chosen uniformly from its output domain. If a query is repeated the random oracle responds the same way every time that query is submitted. That is, a random oracle is a mathematical function chosen uniformly at random, that is, a function mapping each possible query to a (fixed) random response from its output domain.

A "key agreement" enables two or more parties to agree on a key in such a way that both influence the outcome. Key agreements do not require or permit third party input and thus do not reveal to a shared secret any eavesdropping party what key has been agreed upon. Protocols where both parties influence the final derived key may be the only way to implement perfect forward secrecy.

A "cryptographic function" is a mathematical equation, function, process, or algorithm that may be used to encrypt or decrypt information. Some cryptographic functions are one-way functions, such as hash functions. Other cryptographic functions may be reversible if a designated input, such as a key, is provided.

An "input value" is an alphanumeric value or string used as input or an initiator of computation of a function. An input value defines a number of values to be generated and transmitted to a sender device. Specifically, the input value may define the number of elements in the set of values to be transferred to a sender device as part of a request for encrypted information. Because the number of pieces of encrypted data from which a selection is made by the sender device may be determined based on the number of values received, the input value may be thought of as an indicator of the size of a potential key space on the sender device.

A "cryptographic value" is an alphanumeric value or string that has been encrypted. A cryptographic value may be generated by encrypting a public key and a piece of data resident on a sender device.

An "encrypted program" refers to a cryptographic protocol or application. The encrypted program may be evaluated privately at one or participating parties, using encrypted data provided during a fast-oblivious transfer. Examples of encrypted programs include but are not limited to garbled circuits, secret shares, secure multi-party computations, and the like.

DETAILED DESCRIPTION

Systems and methods according to aspects enable secure fast oblivious transfers between computing devices. Computing devices may efficiently and securely execute a key agreement using shared computation to transfer data, such as cryptographic keys, without either party having actual knowledge of the specific data being transferred. The encrypted data, once transferred, can be used to execute an encrypted program amongst the parties.

Certain aspects present significant advantages in efficiency and speed of key agreements by enabling oblivious transfers with a random oracle to enable the transmission of cryptographic values and the transmission of cryptographic protocols. Hash functions characterized as random oracles may compute unique values enabling random selection of cryptographic keys or data to be shared between computing devices. Key agreements may be quickly executed, with random cryptographic keys obtained at each execution. The obtained cryptographic keys or data may be used to execute or evaluate additional cryptographic protocols.

In general, a key agreement protocol involves two or more parties agreeing on a cryptographic key with both parties influencing the outcome of which key is selected. Key agreements can remove the ability of a third party to influence the choice of which key is selected. Secure key agreements protect the key choice from eavesdropping parties. The use of a key agreement protocol avoids some of the key distribution security problems associated with conventional transmission of cryptographic keys.

Certain aspects provide fast, privacy-preserving, key agreements for use in obtaining encrypted data for a subsequent execution of an encrypted program. The fast oblivious transfer enables transferring sensitive data without providing either party with knowledge of the data being transferred. For example, a receiver device may have permission to access data within a data set of a sender device, but may not wish for the sender device to know which data are accessed. Similarly, the sender device may prefer that the receiver device only access a predetermined number of elements of the data set. Various aspects enable the efficient transfer of the predetermined number of elements from the data set without informing either party as to which elements were transferred to the receiver.

Efficient, privacy-preserving data transfers as described herein may be particularly advantageous in distributed big data analysis because they enable data wonders to share data for analysis without becoming aware of the work being done by analysis. Encrypted data is transferred as a result of both parties computing part of a cryptographic function without requiring a third-party, thus preserving privacy in a lightweight and efficient manner.

Fast oblivious transfer are also advantageous in supporting auction bidding systems. A bidding system may receive encrypted bids without being aware of the bidder or the details of the bid until they are needed. Two or more parties may engage in the computation of a cryptographic function on the encrypted bids, with the output being the winning bid and the dollar amount of the bid.

Certain aspects of the present disclosure may include techniques for pair-wise oblivious transfers. Techniques are described herein with regard to two computing devices exchanging computing portions of a cryptographic function in order to exchange encrypted information. However, the described techniques scale in a pair-wise fashion, enabling the addition of more parties to the function computation and data exchange.

As a further advantage, the techniques for efficient, privacy-preserving oblivious transfer may provide post-quantum computing security benefits because the distribution of the computational tasks across multiple devices may be very difficult for a computing device of any processing power to overcome with brute force computation.

The various aspects disclosed herein provide solutions for enabling secure, non-traceable, authenticable fast oblivious transfers between computing devices. By enabling a receiver device to compute multiple values and receive from a sender device a piece of encrypted data, such as a cryptographic key, corresponding to one of the values, the various techniques ensure that neither party is aware of the specific encrypted data being transferred back to the receiver device. Because the computation occurs within two or more computing devices without requiring a third party to authenticate or pass information, the transfers are fast and efficient, reducing time and computing resources needed to exchange encrypted information.

I. Multi-Party Computation Network

FIG. 1 shows a simplified message flow diagram 100 illustrating secure communications between a client computing device 140 and a server computing device 180, in accordance with some aspects. The message flow diagram 100 may be used between any first computing device and any second computing device. The client/server distinction used herein is merely exemplary and made to improve readability. In some aspects, the client computing device 140 may perform the operations described as being performed by the server computing device 180. In some aspects, the server computing device 180 may perform the operations described as being performed by the client computing device 140.

Referring to FIG. 1, the client computing device 140 may have the capability to generate public/private key pairs and our implement hash functions and random values to implement key agreements. The client computing device 140 and the server computing device 180 may communicate over an unsecured network 160 (e.g., the internet or a wireless local area network). The unsecured network 160 may be "unsecured" in that the communication medium itself is not physically secured or it may be "unsecured" in that communications do not travel directed between two parties but also through other third parties in the network.

The client computing device 140 and the server computing device 180 may perform a key exchange in order to establish secure communications over the unsecured network 160. For example, the client computing device 140 and the server computing device 180 may perform a public/private key exchange or an elliptical-curve Diffie-Hellman key exchange as described above to establish a shared secret between the client computing device 140 and the server computing device 180. The client computing device 140 and the server computing device 180 may each derive a session key from the shared secret for encrypting and decrypting communications between each other.

At 101, the client computing device 140 can transmit a request message to the server computing device 180 to initiate the establishment of secure communication. In some aspects, the request message may include a shared secret such as multiple random values. The client computing device 140 may decrypt the values within a response message using the shared secret to obtain cryptographic keys.

The server computing device 180 can receive the request message from the client computing device 140 via the unsecured network 160. The server computing device 180 can use values within the request message to encrypt multiple cryptographic keys using the shared secret. In some aspects, the server computing device 180 can generate a response message 102 including multiple cryptographic values each representing encryption of one of the cryptographic keys. The response message 102 is transmitted to the client computing device 140 which may attempt to decrypt each of the cryptographic values using a private key. The response message 102 may also include an encrypted program which may be accessed using the decrypted cryptographic key. Alternatively, the encrypted program may be sent in a subsequent message.

II. Secure Transfers Using Oblivious Transfers

An oblivious transfer is a cryptographic primitive often used in the context of secure multi party computation, and is privacy-preserving during a joint computation. Among others, it solves the task of securely distributing cryptographic keys for cryptographi that can be seen as encrypted programs. The combination of oblivious transfers and encrypted programs gives a generic solution for securely computing any functionality between two parties.

In an oblivious transfer, a sender and a receiver interact in a protocol and at the end of the protocol, the sender outputs two messages $s_0$, $s_1$ while the receiver outputs b, $s_b$ for choice bit b. Security asks that the sender does not learn b and the receiver does not learn $s_{1-b}$. Oblivious transfer implies key exchange and can be constructed from special types of public key encryption or certified trapdoor permutations. In the present disclosure, an oblivious transfer is instantiated with a key exchange. This framework is very agile in terms of assumptions and provides post-quantum security efficiently.

A. Use of OT with Sender and Receiver Devices

Figure 2:
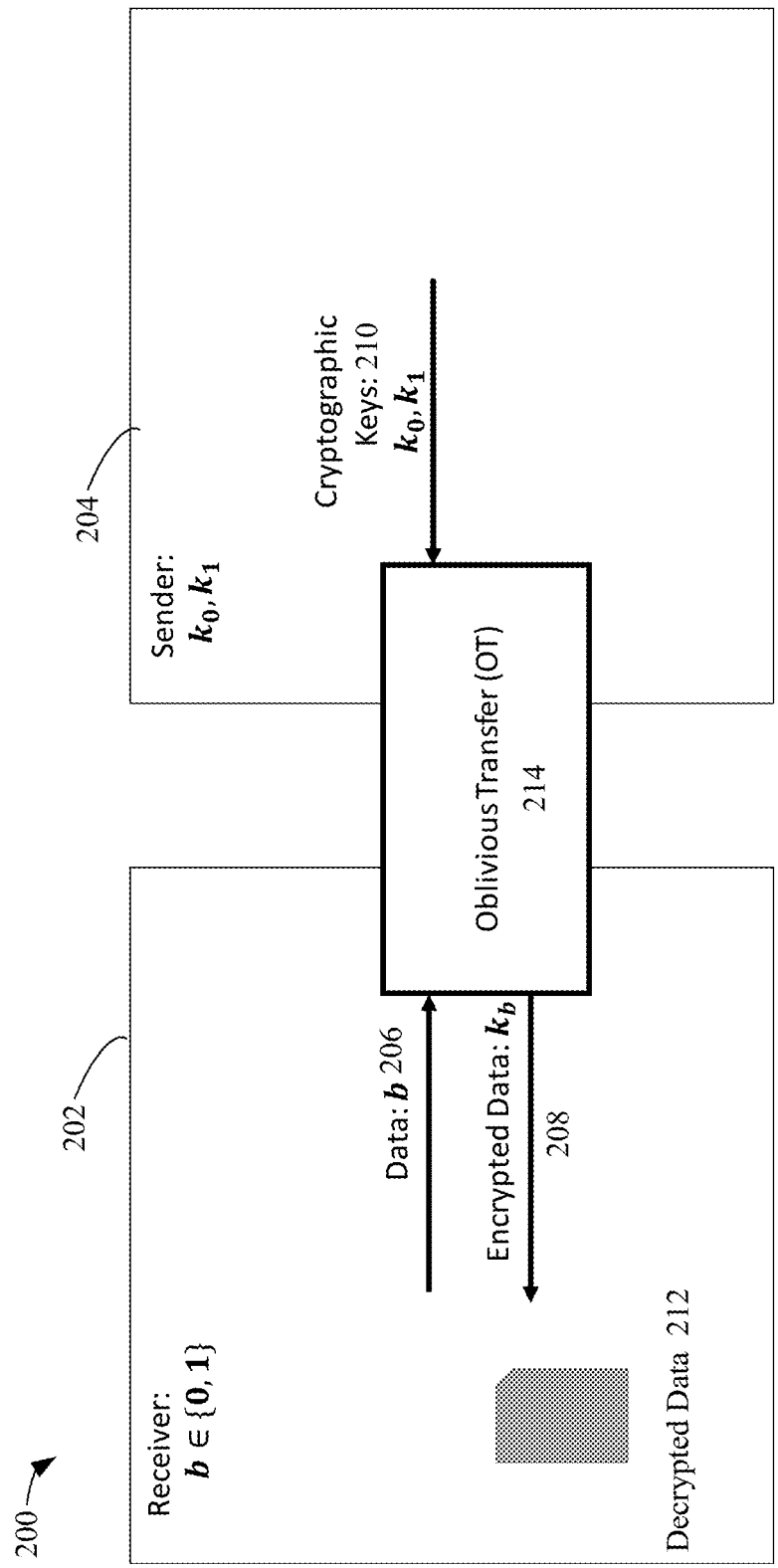
FIG. 2 shows a message flow diagram of a receiver device securely obtaining a key from a sender device using oblivious transfer.

FIG. 2 shows a message flow diagram of a receiver device securely obtaining a cryptographic keys from a sender device using oblivious transfer. The message flow diagram 200 shows a receiver device 202 (e.g., client computing device 140) requesting cryptographic keys 210 from a sender device 204 (e.g., server computing device 180). The sender device 204 may encrypt and send some or all of the cryptographic keys 210. The receiver device may decrypt one of the received cryptographic keys 210 using a private key, without actual knowledge as to which key is decrypted. In some examples, the sender device 204 may generate, maintain, and, or store both the cryptographic keys 210 and an encrypted program such as encrypted program.

In oblivious transfers 214, one party may have several pieces of data, and another party may request and obtain some or all of those pieces of data, and may only decrypt one piece to create decrypted data 212, without revealing to either party, which piece of decrypted data 212 was obtained. In the message flow diagram 200, the receiver device 202 may generate multiple values, i.e. pieces of data 206 using an input value b. The input value b may be an element of a set of inputs such as the set {0, 1}. In some examples the size of the input set may be as large as the number of cryptographic keys 210 that may be generated by or stored on sender device 204 or vice versa. The actual value of input value b will determine which of the cryptographic keys 210 is decrypted by the receiver device 202. The input value b may thus correspond to one of the elements of set of cryptographic keys 210.

Sender device 204 has a set of cryptographic keys 210 including a first key $k_0$ and a second key $k_1$. If input value b is set to 0 then the sender device 204 may encrypt and send both the first key $k_0$ and the second key $k_1$, but the receiver device 202 will only be able to decrypt the first key $k_0$ because the private key is generated by the receiver device 202 using the input value of b=0. The receiver device 202 may decrypt one of the cryptographic keys 210 received from the sender device 204 using the decryption key corresponding to the input value b, without revealing the actual value of b to either the receiver device 202 or the sender device 204.

In response to receiving a number of values having a size equal to the set of input values, and at least one of the multiple values generated using the input value b, the sender device 204 may transmit all of the cryptographic keys 210 to receiver device 202. Although the receiver device 202 may use all or some of the values in the input value set to generate the multiple values sent to the sender device 204, the sender device 204 will not have knowledge of which of the multiple values corresponds to the input value b. By transmitting all elements within the set of cryptographic keys 210 that correspond to the received multiple values, the sender device 204 is prevented from knowing which of the cryptographic keys will be used or accessed by the receiver device 202. The sender device 204 may only be aware that a request for a cryptographic keys 210 was made and that a number of cryptographic keys 210 corresponding to the number of multiple values received were sent to the receiver device 202.

The sharing of some or all cryptographic keys 210 between the receiver device 202 and sender device 204 may present the possibility of teaching the receiver device 202 all of the cryptographic key options. To avoid this oversharing, the receiver device 202 may only be able to decrypt one of the cryptographic keys 210. Specifically, only $k_b$ may be decrypted from the encrypted data 208 containing the cryptographic keys 210, and may require the use of input value b. Decryption of $k_b$ occurs at the receiver device 202 using a private decryption key generated using the input value b, leaving the sender device 204 ultimately unaware of which cryptographic key was decrypted, while also preventing the receiver device 202 from discovering more than one of the cryptographic keys 210.

B. Example Applications

Figure 3:
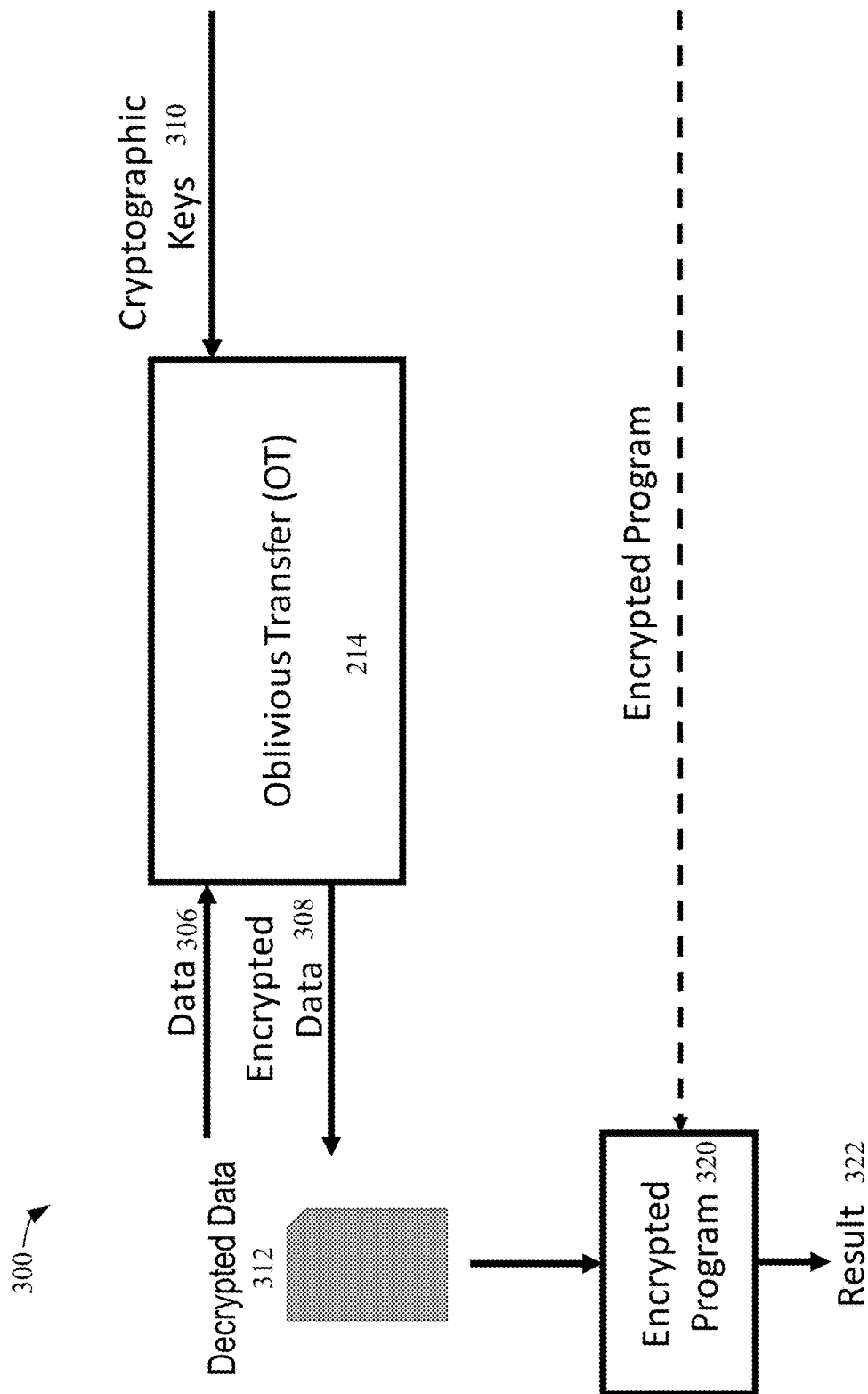
FIG. 3 shows a message flow diagram of an example secure data exchange using an oblivious transfer.

FIG. 3 shows a message flow diagram of an example secure data exchange using an oblivious transfer. In the message flow diagram 300, an oblivious transfer 214 may receive data 306, e.g., multiple values produced by a receiver device 202. Thus, the receiver device 202 may send the data 306 to a sender device 204 having several cryptographic keys 310 and an encrypted program 320, and may receive both the cryptographic keys 310 and the encrypted program 320 in response. The cryptographic keys 310 and the encrypted program 320 may be sent in the same or different transmissions.

Oblivious transfer 214 may receive a cryptographic key 310 at a sender device 204, in order to return an output of encrypted data 308 to be decrypted by the receiver device 202. The obtained decrypted data 312 may be used in accessing, evaluating, or executing an encrypted program 320. The oblivious transfer 214 may make use of one or more shared secrets including the multiple values generated by a receiver device 202, and multiple cryptographic values (e.g., encrypted data 308) generated by the sender device 204.

The sender device 204 to receive the multiple values from the receiver device 202 and use these values to select one or more of the cryptographic keys 310 without knowledge by any participating parties as to which key has been selected. Although all or a portion of the cryptographic keys 310 are sent to the receiver device 202 as cryptographic values or encrypted data 308, the receiver device 202 may only decrypt one of the pieces of encrypted data 308 to reveal one of the cryptographic keys 310. In this manner, the oblivious transfer 214 may enable the provision of a single cryptographic key between two parties, without the parties knowing which cryptographic key is exchanged.

The sender device 204 stores and maintains the cryptographic keys 310 and may also be responsible for storing and maintaining an encrypted program 320. This encrypted program 320 may be passed to the receiver device 202 as multiple cryptographic values, e.g., encrypted data 308. The encrypted data 308, e.g., the cryptographic keys 310, may be passed the encrypted program 320, which may be a cryptographic protocol such as garbled circuit, multi-party computations, or other cryptographic protocols. The received encrypted data 308 is decrypted by the receiver device 202 and used to access, evaluate, or execute the encrypted program 320.

In certain aspects, the oblivious transfer 214 may be used as part of a key agreement protocol. A receiver device (e.g., the client or server in FIG. 1) may use a random oracle to generate a number of unique values based on an input value, which may be one of a set of input values. The number of input values in the set may define the number of cryptographic keys 310 returned to the receiver device. Each of the unique values are data 306 corresponding to one of the cryptographic keys 310. Thus, each input to the random oracle produces a number of unique values equivalent to the potential key space (e.g., the number of cryptographic keys 310 on a sender device). The cryptographic keys 310 are encrypted and transmitted to the requester as encrypted data 308, but only one key associated with one of the multiple values of data 306 can be decrypted by the requester. For example, only the cryptographic key corresponding to the input value may be decrypted by the requester.

The encrypted program 320 may be accessed and or executed using the cryptographic key obtained by decrypting the encrypted data 308. The encrypted program 320 may be a cryptographic protocol such as multi-party computation, garbled circuit, or those requiring a secret share or shared key. The cryptographic key obtained from decrypting the encrypted data 308 may thus be used as the shared secret or shared key for carrying out the encrypted program 320 between computing devices.

Applications of the oblivious transfer 214 may be used as part of an auction system or distributed big data analysis system. Oblivious transfer 214 may receive data 206 in the form of auction bids or research requests for a sender device 204 hosting the bidding system or research data repository. The sender device 204 may select a number of bids or data sets as defined by data 306 received from the receiver device 202. The receiver device 202 receives encrypted data 308 including the auction bids and an auction bid management program (e.g., an encrypted program 320); or multiple pieces of data or data sets along with a processing tool. The receiver device 202 may decrypt the encrypted data 308 to receive the winning bid and may use this input to execute the auction bid management program to inform the winning bidder and take additional actions such as automatic withdrawal of funds. Similarly, the requester may decrypt one of the received encrypted pieces of data or data sets and may use this data as input to the processing tool, which may further scrub any private information (e.g., for HIPPA compliance purposes).

In another aspect, a big data analysis system may be implemented in which the input value used to generate the data 306 corresponds to one of the cryptographic key 310, each of which is capable of enabling access to one of a number of computing devices hosting research data within the big data analysis system. The cryptographic keys 310 may be sent to the receiver device 202 as encrypted data 308, and decrypted using a private key to provide one of the cryptographic keys 310. The obtained cryptographic key 310 may be used as input to the encrypted program 320 which may direct a subsequent research data request to a computing device within the big data analysis system that corresponds to the obtained cryptographic key. Thus, the receiver device 202 may be given access to a research data set, without knowing which research data set it is being given, or where the data originates. Computing devices within the system are also unaware of who is using their research data and thus cannot track research trends by other organizations.

Many aspects of the encrypted program 320 may be advantageously implemented using blockchain technology. For instance, in the auction example previously described, the encrypted program 320 may involve the use of smart contracts in which the value of a winning bid is automatically deducted from a winner's payment account at the time the win is determined. Similarly, blockchain or other ledger based technologies may be useful in tracking use of research data or identifying research data hoses within a big data analysis system, and may enable immediate access to a host computing device by a receiver device 202 having the corresponding cryptographic key.

For the purposes of providing a clear and concise disclosure of the various aspects, the following description of fast, oblivious transfers is made with reference to examples of key agreements. However, as discussed above, the application of these techniques are not limited to key agreements and may be applied widely to systems in which a first computing device requires the use of one of multiple pieces of data maintained on a second computing device, without either computing device being aware of which of the multiple pieces of data is actually obtained by the first computing device.

III. Encryption Implementations

This disclosure provides implementations for two oblivious transfer protocols capable of being performed in one millisecond. In a WAN network setting the implementation described in FIG. 5 may be the fastest, requiring 110 ms. The next fastest may be the implementation disclosed with reference to FIG. 4, requiring 210 ms. In addition to speed and efficiency, the two oblivious transfer protocols described herein achieve full simulation based security without performing additional rounds. Thus, both the public key encryption implementation of FIG. 4 and the Elliptic-Curve Diffie-Hellaman implementation of FIG. 5 provide fast, secure, oblivious protocols.

A. Public Key Encryption

Figure 4:
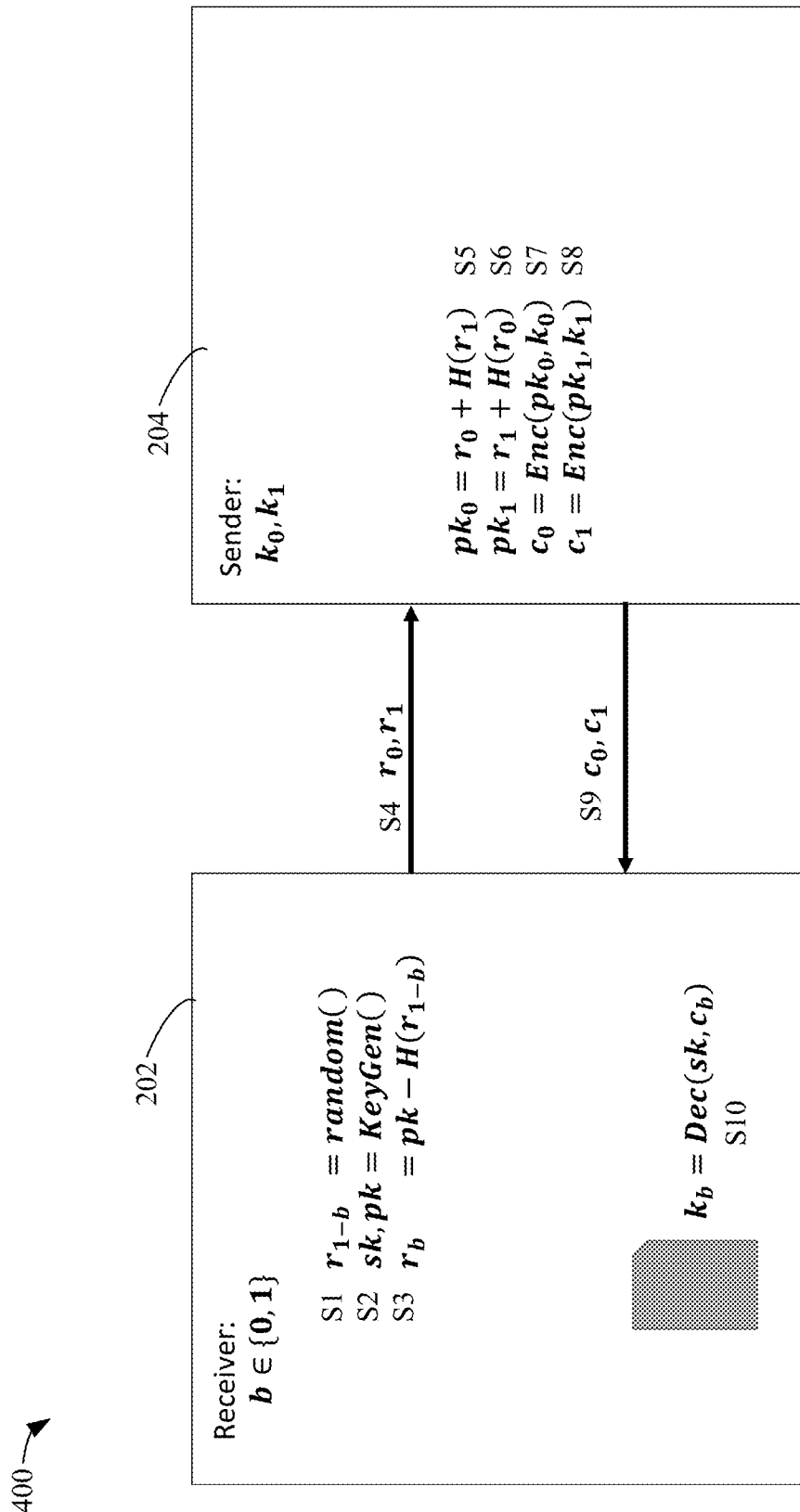
FIG. 4 shows a message flow diagram of a receiver device securely obtaining a key from a sender device using oblivious transfer with hash functions, in accordance with some aspects.
Figure 5:
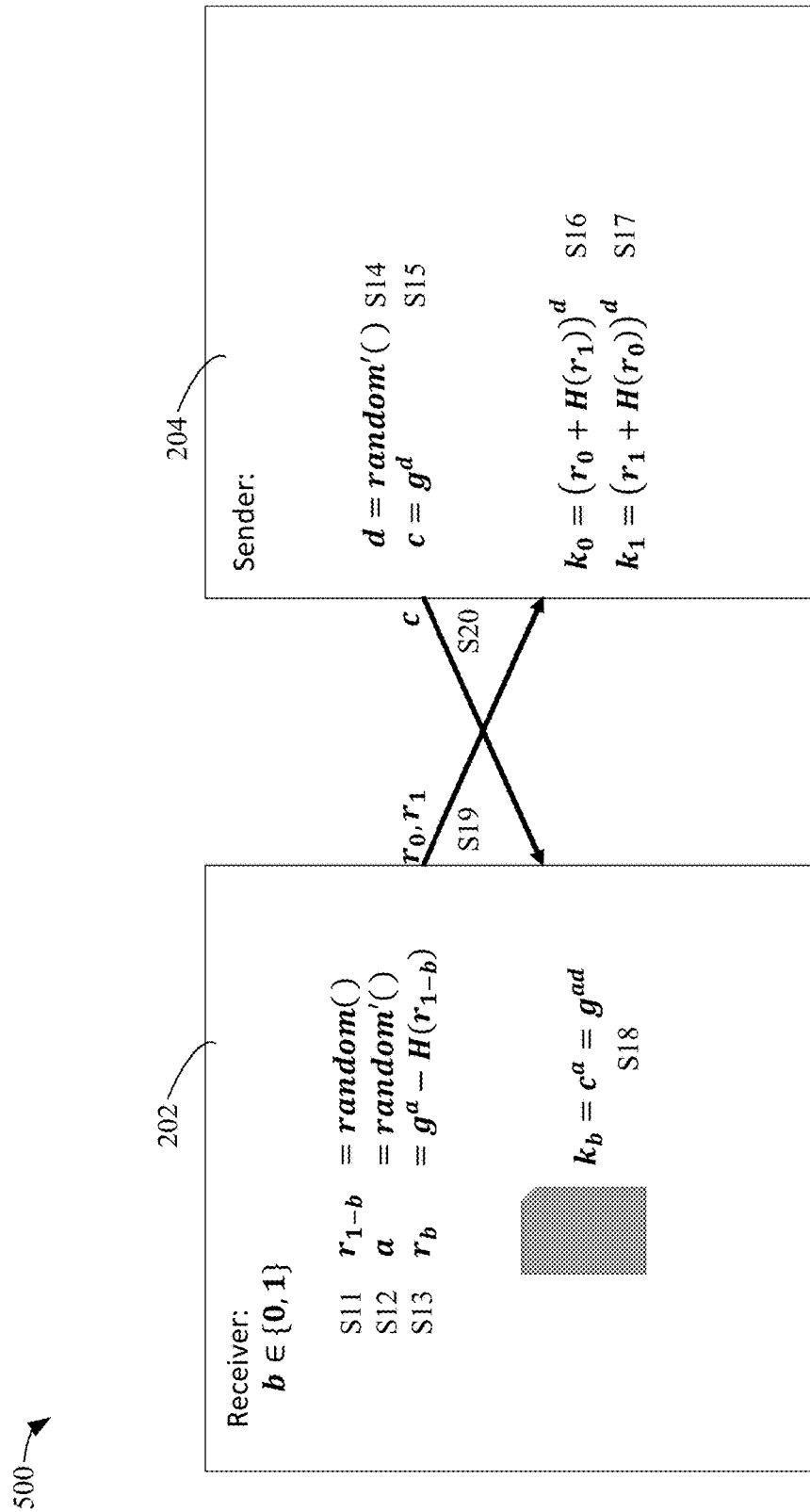
FIG. 5 shows a message flow diagram of a receiver device securely obtaining a key from a sender device using oblivious transfer with elliptic-curve Diffie-Hellman and hash functions, in accordance with some aspects

FIG. 4 shows a message flow diagram 400 of a receiver device 202 securely obtaining a cryptographic key from a sender device using oblivious transfer with public key encryption, in accordance with some aspects. The message flow diagram 400 shows a receiver device 202 (e.g., client computing device 140) requesting cryptographic keys from a sender device 204 (e.g., server computing device 180) using an oblivious transfer function. The oblivious transfer function may employ public key cryptographic techniques and hash functions as a random oracle to ensure that neither the sender device 204 or the receiver device 202 knows which one of the cryptographic keys is decrypted by the receiver device 202.

The receiver device 202 may begin by sampling an input value b from an input value set from 1 to n. in step S1, for each input value other than b, the receiver device may generate a random value r having the same length as a public key. For instance, in message flow diagram 400 the input value set has 2 elements, one of which will be input value b, and the other element of the input value set will be associated with a value $r_{1-b}$, which is generated using a random number generator to produce the a value having the same size as a public key. In the illustrated example, input value b will be assumed to be 0.

A key generation function, e.g., keygen( ), is used in step S2 to generate both a public and a private key. The key generation function may use any of a number of public key cryptography algorithms such as RSA, elliptic-curve, or the like. The output of the key generation function will be a public key and a private key. The public key may have the same bit length as the random value $r_{1-b}$.

To obtain a value $r_b$ corresponding to the input value b, a hash output of $r_{1-b}$ is used in conjunction with the the public key to perform a group operation in step S3. For example, the random value $r_{1-b}$ may be subjected to a hash function H( ) to produce a hash output to be subtracted from the public key such that $r_b = pk - H(r_{1-b})$. Other invertible group operators such as addition, multiplication, division, XOR, and elliptic-curve addition may be used as the operation acting on the public key and the hash output. The value $r_b$ may thus be considered a mask for the public key while the value $r_{1-b}$ is a random value having the same length as the public key and $r_b$. Both the random $r_{1-b}$ and $r_b$ are transmitted to the sender device 204 in step S4 as a request for cryptographic keys. Although both of the multiple values r are sent, only $r_b$ may be used in conjunction with the hash function H to obtain the public key pk.

The sender device 204 may receive both $r_{1-b}$ and $r_b$ which may be sent as $r_1$ and $r_0$ respectively, but the sender device 204 does not know which of the multiple values is useful in obtaining the public key pk. Each of $r_0$ and $r_1$ may be added to $H(r_0)$ and $H(r_1)$ respectively in steps S5 and S6, to obtain $pk_0$ and $pk_1$. That is $pk_0 = r_0 + H(r_1)$ and $pk_1 = r_1 + H(r_0)$ functions are used to obtain the public keys. However, only $pk_0$ corresponds to the public key stored on the receiver device 202.

In steps S7 and S8, ach of $pk_0$ and $pk_1$ may be encrypted along with a corresponding cryptographic key $k_0$ and $k_1$ from the sender device's set of cryptographic keys. Encryption of the public key $pk_0$ and the corresponding cryptographic key $k_0$ may produce a cryptographic value $c_0$. For example $c_0$=Encryption($pk_0$, $k_0$). The cryptographic value $c_1$ is similarly generated using $pk_1$ and $k_1$. Both $c_0$ and $c_1$ may be sent to the receiver device 202 in step S9. Thus, the receiver device 202 may be provided with both cryptographic keys $k_0$ and $k_1$ via the cryptographic values $c_0$ and $c_1$.

Upon receiving both $c_0$ and $c_1$, the receiver device 202 may attempt to decrypt both using the secret key skin step S10. Only the cryptographic value c generated by encrypting pk (i.e., $pk_0$) will be successfully decrypted to reveal the accompanying cryptographic key (i.e., $k_0$). In this manner, the receiver device 202 is prevented from accessing the cryptographic key $k_1$, because the cryptographic value $c_1$ cannot be decrypted using the secret key sk.

In the message flow diagram 400, key generation by the receiver device 202 and deception/encryption by the sender device 204 may be a relatively linear procedure. An order of information flow is illustrated by the bold arrows. These techniques may provide post-quantum security advantages.

Examples of public key techniques that may include elliptic-curve cryptography, Diffie-Hellman, etc. The random number should be the same length as the public key. Any public key algorithms supporting input strings of the same size as a public key may be used. As examples, Hash function H( ) may be implemented by random oracle, SHA3, SHA256, Blake, or any function in which a hash function may output a public key. The nature of the hash function may be dependent upon the public key encryption algorithm selected. The Hash function output should mirror the output of the public key generation algorithm.

B. Diffie-Hellman Encryption

FIG. 5 shows a message flow diagram 500 of a receiver device securely obtaining a key from a sender device using oblivious transfer with Diffie-Hellman and hash functions, in accordance with some aspects. The message flow diagram 500 shows a receiver device 202 (e.g., client computing device 140) requesting a cryptographic key from a sender device 204 (e.g., server computing device 180) using an oblivious transfer function. The oblivious transfer function may include a key agreement using elliptic-curve Diffie- Hellman techniques to provide simultaneity of data exchange and forward secrecy.

Receiver device 202 may obtain a random r from 1-b in step S11 by applying a first random number generator. Rather than generating a secret key, the receiver device 202 may generate a value a using a second random number generator in step S12. The value a may be used as an exponent of a function g in step S13 to produce $g^a$. The random r may be subjected to a hash function H( ) and the result subtracted from $g^a$ such that $r_b = g^a - H(r_{1-b})$. Both the random r and $r_b$ are transmitted in step S19 to the sender device 204. Although both of the r values are sent, but only $r_b$ may be used in conjunction with the hash function H( ) to obtain $g^a$. As with the aspects discussed with reference to FIG. 4, the Hash function may be a random oracle.

At or about the same time that the receiver device 202 is generating and transmitting $r_0$ and $r_1$, the sender device 204 may generate a random value d using the second random number generator in step S14, which may be the same or different from the first random function (e.g., a random number generator). The value d may be used in step S15 as an exponent for the function g to produce $g^d$. This $g^d$ value may be assigned as the cryptographic value c and transmitted to the receiver device 202 in step S20. Thus, one of the c cryptographic values received by the receiver device 202 may be a random value similar in size to $g^a$.

The sender device 204 may also use the values $r_0$ and $r_1$ sent by the receiver device 202 to determine two keys in steps S16 and step S17. Each of the cryptographic keys may be determined by applying an exponent of the value d to the sum of a first r and a hash output of applying H( ) to the remaining r value. For example $k_0 = (r_0 + H(r_1))^d$ are generated by the sender device 204 using the $r_0$ and $r_1$. In such aspects, the sender device 204 does not store the cryptographic keys but generates them at the time of a key agreement.

The receiver device 202 may determine $k_b$ by using the c cryptographic value, the a value and the d value in step S18. For example, $k_b = c^a = g^{ad}$. Thus, values may be passed simultaneously between the sender device 204 and receiver device 202.

The generated cryptographic keys $k_0$ and $k_1$ may be used to generate and send the encrypted program 220 to the receiver device 202. Thus, the encrypted program 220 may be keyed to the cryptographic key decrypted by the receiver device 202.

These aspects may use key agreements to achieve high security levels and increased efficiency though simultaneous key exchange.

IV. Fast-Oblivious Transfers

Methods for implementing the techniques described above may be carried out using various hardware and software components to carry out various functions of oblivious transfers between a sender device 204 and a receiver device 202. The implementations disclosed in FIG. 4 may be carried out using the aspect methods disclosed in greater detail with reference to FIGS. 6 and 7. The implementations disclosed in FIG. 5 may be carried out using the aspect methods disclosed in greater detail with reference to FIG. 8.

A. Public Key Encryption by a Receiver Device

Figure 6:
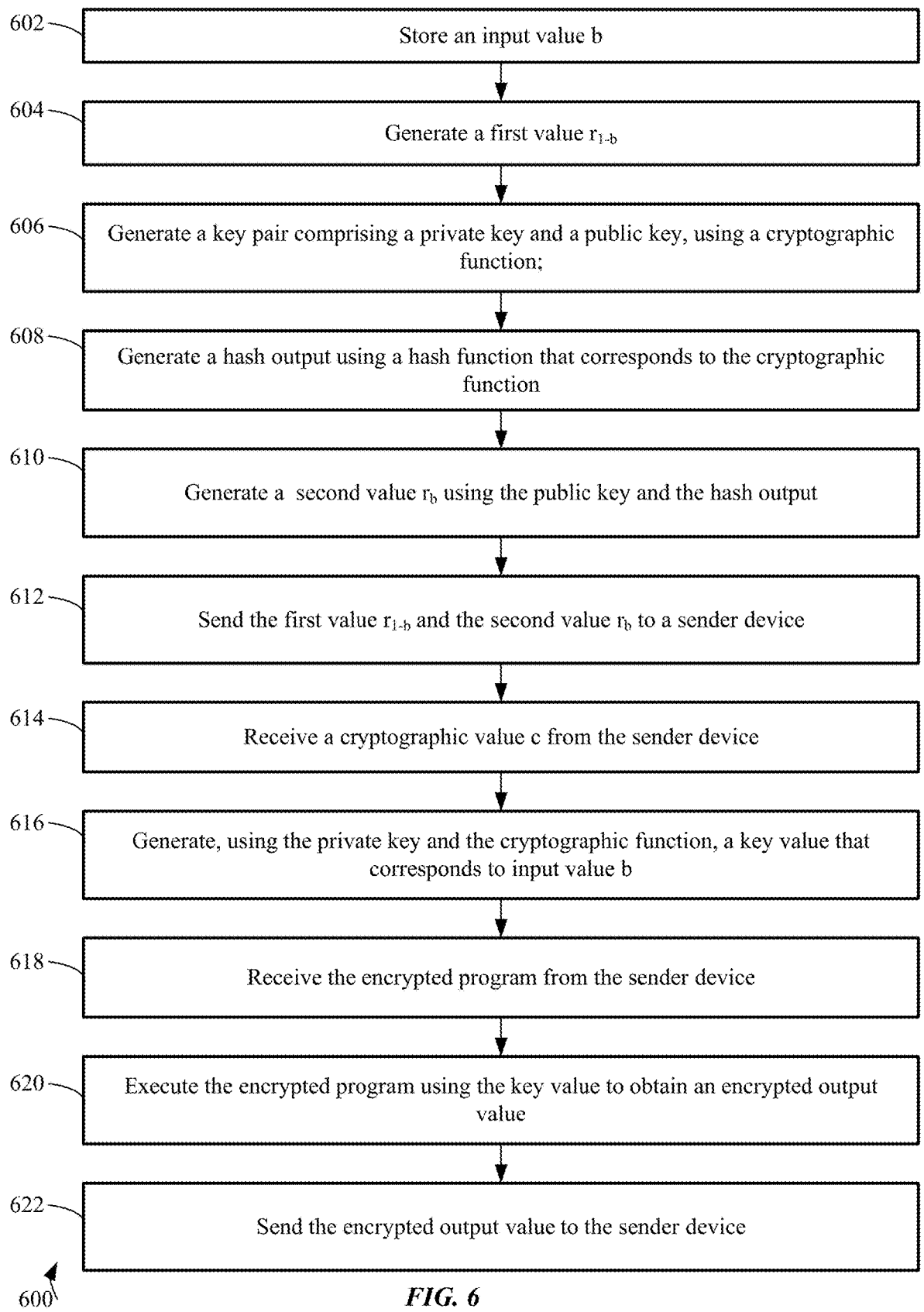
FIG. 6 shows a flow chart of a method for performing a privacy-preserving multi-party computation by a receiver device, in accordance with some aspects.

FIG. 6 shows a flow chart of a method for performing a privacy-preserving multi-party computation by a receiver device, in accordance with some aspects. The method 600 shows a receiver device (e.g., client computing device 140) requesting cryptographic keys from a sender device (e.g., server computing device 180) using an oblivious transfer function. The oblivious transfer function uses public key cryptographic techniques enable data exchange. I In block 602, the processor of the receiver device (e.g., client computing device 140) may store an input value b that is to be used in executing an encrypted program. The input value b may be selected from a set of input values having a size n. The input value may be selected randomly or according to any selection algorithm desired by an administrator.

In block 604, the processor of the receiver device (e.g., client computing device 140) may generate a first value $r_{1-b}$ using a random number generator. For each element of the set of input values other than b, a random number may be generated such that each random number has the same bit size as a public key to be generated by the receiver device. In other aspects, only one value other than b is used to grenade a random number r thereby resulting in only $r_b$ and $r_{1-b}$. The operations performed in block 604 may correspond to step S1 in FIG. 4.

In block 606, the processor of the receiver device (e.g., client computing device 140) may generate a key pair comprising a private key and a public key, using a cryptographic function. The receiver device may use a public key encryption algorithm to generate both a public key and a secret key. The public key will have the same bit length as the value $r_{1-b}$. The operations performed in block 606 may correspond to step S2 in FIG. 4.

In block 608, the processor of the receiver device (e.g., client computing device 140) may generate a hash output using a hash function that corresponds to the cryptographic function. The hash function H( ) may be a random oracle such that for each value $r_{1-b}$ a unique value is produced. Examples of suitable hash functions include, but are not limited to, SHA3, SHA256, and Blake. The operations performed in block 608 may correspond to step S3 in FIG. 4.

In block 610, the processor of the receiver device (e.g., client computing device 140) may generate a second value $r_b$ using the public key and the hash output. For example, the unique value hash output is then subtracted from the public key generated in block 606 to produce the value $r_b$. Other group operations that are invertible may be used in place of addition/subtraction. For example, multiplication, division, XOR, or elliptic-curve addition. Thus, the value $r_b$. is based off the public key and a unique hash output. The operations performed in block 610 may correspond to step S4 in FIG. 4.

In block 612, the processor of the receiver device (e.g., client computing device 140) may send the first value $r_{1-b}$ and the second value $r_b$ to a sender device. Both values may have the same bit length. The multiple values are transmitted to the sender device, with no indication as to which of the values is $r_b$. The operations performed in block 612 may correspond to step S4 in FIG. 4.

In block 614, the processor of the receiver device (e.g., client computing device 140) may receive a cryptographic value c from the sender device, wherein the cryptographic value c is generated using the cryptographic function. The sender device may generate a set of cryptographic values using the public key and cryptographic keys stored on the sender device. At least one of these cryptographic values is transmitted to the receiver device for decryption. The operations performed in block 614 may correspond to step S9 in FIG. 4.

In block 616, the processor of the receiver device (e.g., client computing device 140) may generate, using the private key and the cryptographic function, a key value that corresponds to input value b. The receiver device may use the cryptographic function and the secret key to attempt to decrypt any cryptographic values received from the sender device. Only a cryptographic value generated by the sender device using the public key generated in block 606 will be capable of being decrypted by the receiver device. The operations performed in block 616 may correspond to step S10 in FIG. 4.

In block 618, the processor of the receiver device (e.g., client computing device 140) may receive the encrypted program (e.g., garbled circuit) from the sender device. The sender device may transmit the encrypted program with or separate from the cryptographic value(s). The encrypted program may or may not be keyed to the cryptographic key associated with the cryptographic value c.

In block 620, the processor of the receiver device (e.g., client computing device 140 execute the encrypted program using the key value to obtain an encrypted output value. For instance, the key value obtained from decrypting the cryptographic value c may be used as input to the encrypted program.

In block 622, the processor of the receiver device (e.g., client computing device 140 send the encrypted output value to the sender device, wherein the sender device decrypts the encrypted output value using the key value. In some aspects the output of the encrypted program may be returned to the sender device for decryption.

B. Public Key Encryption by a Sender Device

Figure 7:
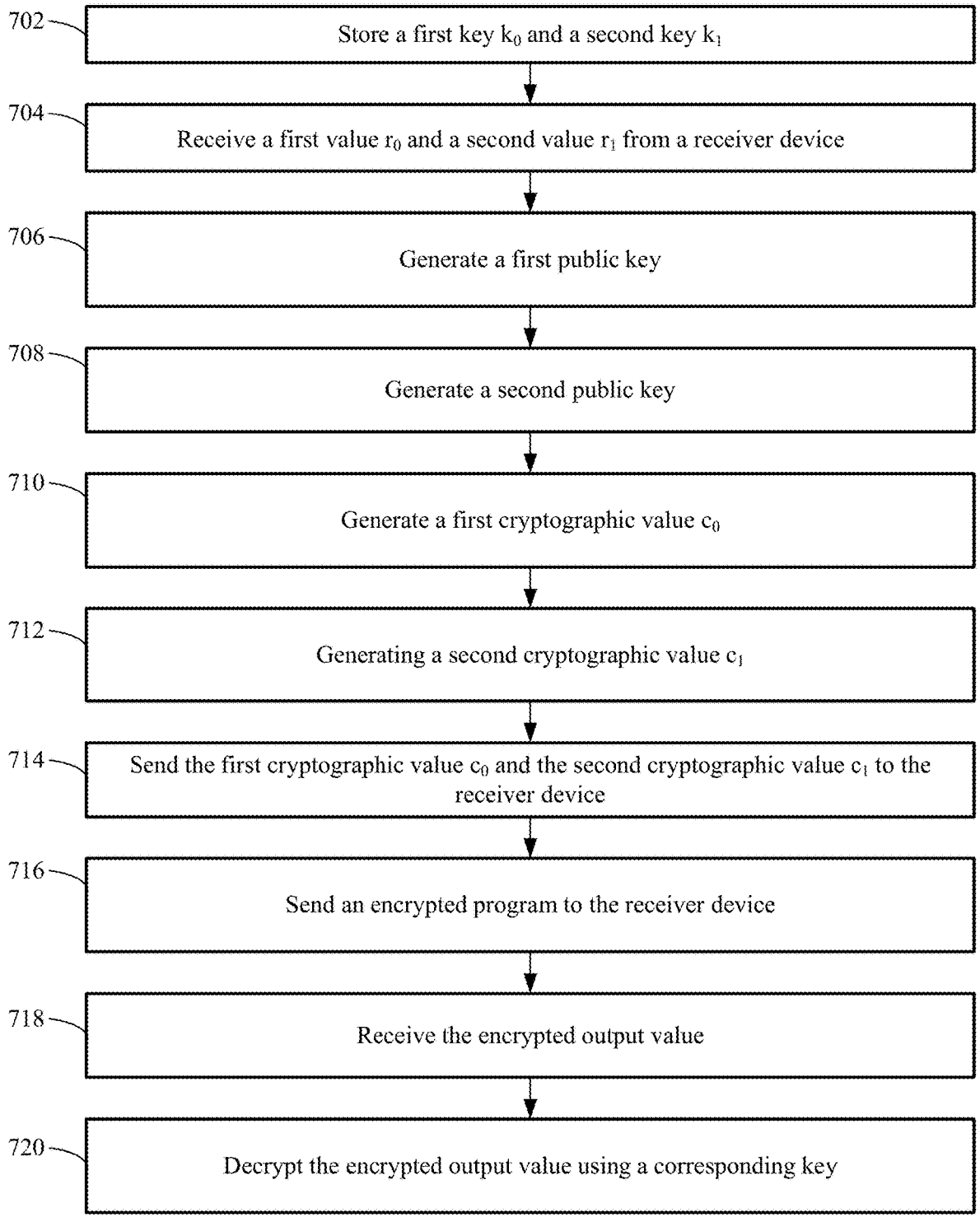
FIG. 7 shows a flowchart of a method performing a privacy-preserving multi-party computation by a sender device, in accordance with some aspects.

FIG. 7 shows a flowchart of a method performing a privacy-preserving multi-party computation by a sender device, in accordance with some aspects. The method 700 shows a sender device (e.g., server computing device 180) sending cryptographic keys to a receiver device (e.g., client computing device 140) using an oblivious transfer function. The oblivious transfer function uses elliptic-curve Diffie-Hellman cryptographic techniques enable data exchange.

In block 702, the processor of the sender device (e.g., server computing device 180 may store a first key $k_0$ and a second key $k_1$. The first and second key may be part of a set of cryptographic keys generated, maintained and, or stored on the sender device. The cryptographic keys may provide access to an encrypted program also generated, maintained, and, or stored on the sender device.

In block 704, the processor of the sender device (e.g., server computing device 180 may receive a first value $r_0$ and a second value $r_1$ from a receiver device. The sender device may receive the two values without the capability of determining which of the two values was generated using a public key.

In block 706, the processor of the sender device (e.g., server computing device 180 may generate a first public key using the first value $r_0$ and a first hash output by operating a hash function H on the second value $r_1$, wherein the hash function H corresponds to a cryptographic function used by the receiver device to generate at least one of the first value $r_0$ and the second value $r_1$. That is, the sender device may provide the two values individually as input to the has function H( ). One of the two values was generated by the receiver device using a hash of the other value. Thus, the output of one of the hash function executions will be a component of the other received value. Adding this hash output to the received value will generate the public key. The operations performed in block 706 may correspond to step S5 in FIG. 4.

In block 708, the processor of the sender device (e.g., server computing device 180 may generate a second public key using the second value $r_1$ and a second hash output by operating the hash function H on the first value $r_0$. For example, the sender device may perform the same operations as those discussed with reference to block 706. Adding the hash output of the other value to the received value will generate an unrelated string having a bit size consistent with that of the public key. Thus, only one of the public keys generated will be the actual public key generated by the receiver device. The operations performed in block 708 may correspond to step S6 in FIG. 4.

In block 710, the processor of the sender device (e.g., server computing device 180 may generate a first cryptographic value $c_0$ by operating the cryptographic function on the first public key and the first key $k_0$. The sender device may encrypt the public key and a first cryptographic key using an encryption function. The operations performed in block 710 may correspond to step S7 in FIG. 4.

In block 712, the processor of the sender device (e.g., server computing device 180 may generate a second cryptographic value $c_1$ by operating the cryptographic function on the second public key and the second key $k_1$. The sender device may encrypt the second public key and a second cryptographic key using an encryption function. The operations performed in block 712 may correspond to step S8 in FIG. 4.

In block 714, the processor of the sender device (e.g., server computing device 180 may send the first cryptographic value $c_0$ and the second cryptographic value $c_1$ to the receiver device. No indicator is provided as to which of the cryptographic values is associated with the public key generated by the receiver device.

In block 716, the processor of the sender device (e.g., server computing device 180 may send an encrypted program to the receiver device, wherein the receiver device executes the encrypted program to generate an encrypted output value. The encrypted program may be keyed to the first or second key, or may be independent thereof.

In block 718, the processor of the sender device (e.g., server computing device 180 may receive the encrypted output value. The output value may be the result of executing the encrypted program using either the first key or the second key, whichever is successfully obtained from decrypting the cryptographic values by the receiver device.

In block 720, the processor of the sender device (e.g., server computing device 180 may decrypt the encrypted output value using a corresponding key.

C. Elliptic-Curve Diffie-Hellman Encryption

Figure 8:
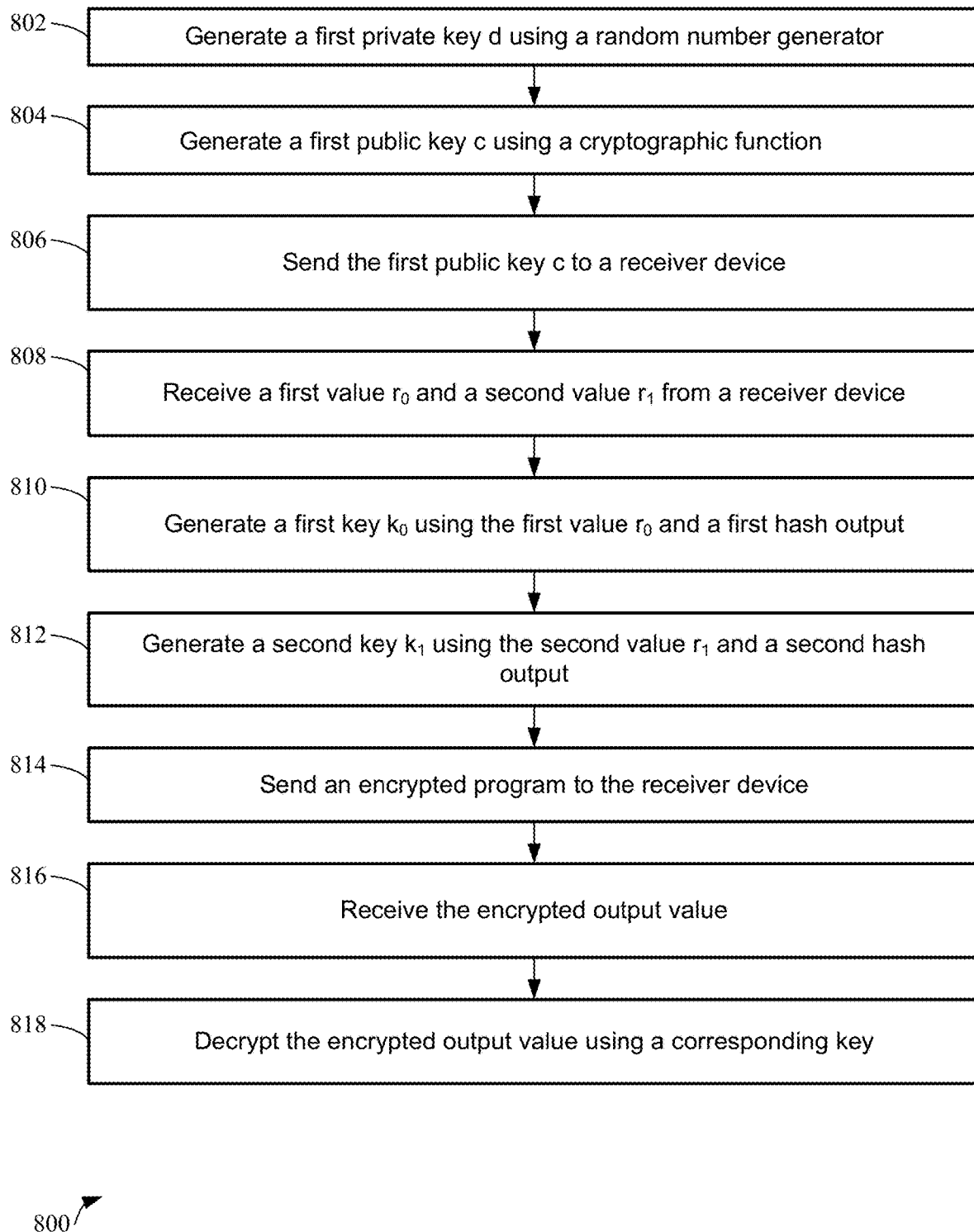
FIG. 8 shows a flowchart of another method for performing a privacy-preserving multi-party computation by a sender device, in accordance with some aspects.

FIG. 8 shows a flowchart of another method for performing a privacy-preserving multi-party computation by a sender device, in accordance with some aspects.

In block 802, the processor of the sender device (e.g., server computing device 180 may generate a first private key d using a first random number generator. Any type of random number generator may be used to generate the private key. The operations performed in block 802 may correspond to step S14 in FIG. 5.

In block 804, the processor of the sender device (e.g., server computing device 180 may generate a first public key c using a cryptographic function. The public key may be generated by using the first private key d as an exponent for a value g. The operations performed in block 804 may correspond to step S15 in FIG. 5. In block 806, the processor of the sender device (e.g., server computing device 180 may send the first public key c to a receiver device. The operations performed in block 804 may correspond to step S20 in FIG. 5.

In block 808, the processor of the sender device (e.g., server computing device 180 may receive a first value $r_0$ and a second value $r_1$ from a receiver device. One of the values $r_0$ and $r_1$ is generated by the receiver device using a second random number generator. This may differ from or be related to the first random number generator. The other value is generated using the first random number generator to generate a value a and then, using a as an exponent of the value g, a hash output of the randomly generated r value is subtracted from $g^a$. Thus both r values have the bit size of a public key. The sender device is unaware which of the r values was generated using the hash function. The operations performed in block 808 may correspond to step S19 in FIG. 5.

In block 810, the processor of the sender device (e.g., server computing device 180 may generate a first key $k_0$ using the first value $r_0$ and a first hash output by operating a hash function H on the second value $r_1$ to obtain a first intermediate result, wherein the cryptographic function operates on the first intermediate result using the first private key d to generate the first key $k_0$, wherein the hash function H corresponds to the cryptographic function. Similarly, In block 812, the processor of the sender device (e.g., server computing device 180 may generate a second key $k_1$ using the second value $r_1$ and a second hash output by operating the hash function H on the first value $r_0$ to obtain a second intermediate result, wherein the cryptographic function operates on the second intermediate result using the first private key d to generate the second key $k_1$. The receiver device may attempt to access each of the two keys by calculating the cryptographic value c to the power of a and comparing this against the received keys. The correct key $k_b$ will match the computed $c^a$. The operations performed in blocks 810 may correspond to steps S17 and S18 in FIG. 5.

In block 814, the processor of the sender device (e.g., server computing device 180 may send an encrypted program to the receiver device, wherein the receiver device executes the encrypted program to generate an encrypted output value. In some aspects, the encrypted program may be keyed to one of the two cryptographic keys sent to the receiver device. In block 816, the processor of the sender device (e.g., server computing device 180 may receive the encrypted output value. In block 802, the processor of the sender device (e.g., server computing device 180 may decrypt the encrypted output value using a corresponding key.

V. Computing Device

Figure 9:
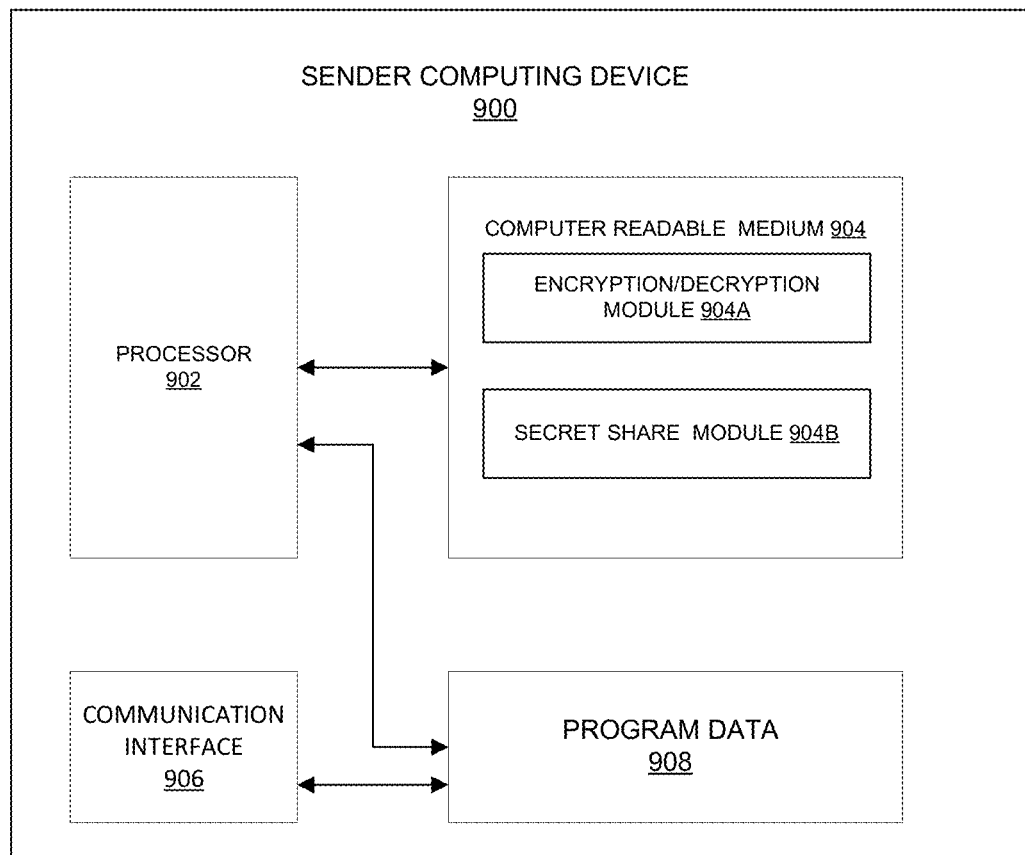
FIG. 9 shows a block diagram of a sender device for performing a secure fast oblivious transfer, in accordance with some aspects.

FIG. 9 illustrates a sender device 900 for use in performing secure fast oblivious transfers. Sender device 900 may include one or more processors 902, coupled to a computing device readable medium 904, communication interface 906, and program data 908

The computing device readable medium 904 may comprise an encryption/decryption module 904A and a secret share module 904B. The encryption/decryption module 904A may comprise instructions for instructing the one or more processors 902 to encrypt a program and program data. The secret share module 904B may comprise instructions for instructing the one or more processors 902 to generate public keys and share the transmit the keys and encrypted program data.

The computing device readable medium 904 may comprise code, executable by the processor 902, for implementing any of methods 600, 700, or 800.

Figure 10:
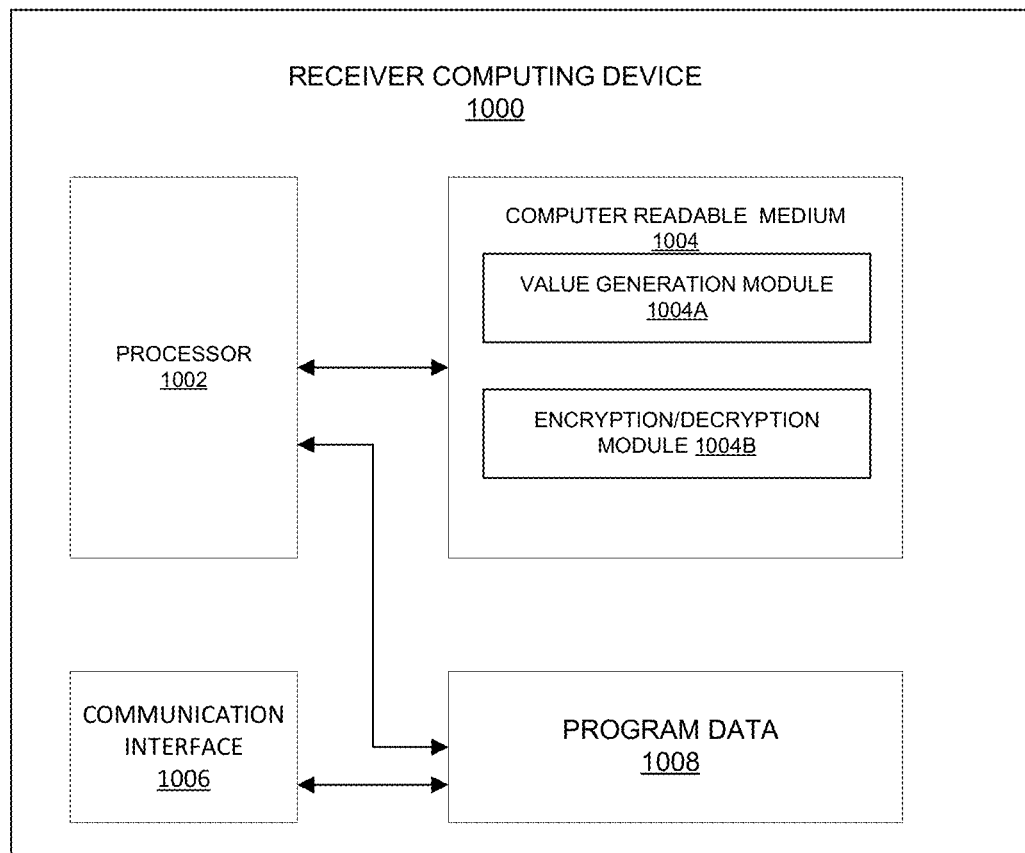
FIG. 10 shows a block diagram of a receiver device for performing a secure fast oblivious transfer, in accordance with some aspects.

FIG. 10 illustrates a receiver device 1000 for use in performing secure fast oblivious transfer. Receiver device 1000 may include one or more processors 1002, coupled to a computing device readable medium 1004, communication interface 1006, and program data 1008. In various aspects, receiver device 1000 may have some or all of the same components as sender device 900.

The computing device readable medium 1004 may comprise a value generation module 1004A and an encryption/decryption module 1004B. The value generation module 1004A may comprise instructions for instructing the one or more processors 1002 to generate a first and a second value using a cryptographic function. The encryption/decryption module 1004B may comprise instructions for instructing the one or more processors 1002 to generate a hash output using a has function, decrypt an encrypted program, and decrypt encrypted program data.

The computing device readable medium 1004 may comprise code, executable by the processor 1002, for implementing any of methods 600, 700, or 800.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computing device language such as, for example, Java, C, C++, C#, Objective-C, Swift, or scripting language such as Perl or Python using, for example, conventional or object-oriented techniques. The software code may be stored as a series of instructions or commands on a computing device readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computing device readable medium may be any combination of such storage or transmission devices.

Such programs may also be encoded and transmitted using carrier signals adapted for transmission via wired, optical, and/or wireless networks conforming to a variety of protocols, including the Internet. As such, a computing device readable medium according to an aspect of the present invention may be created using a data signal encoded with such programs. Computing device readable media encoded with the program code may be packaged with a compatible device or provided separately from other devices (e.g., via Internet download). Any such computing device readable medium may reside on or within a single computing device product (e.g. a hard drive, a CD, or an entire computing device system), and may be present on or within different computing device products within a system or network. A computing device system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any aspect may be combined with one or more features of any other aspect without departing from the scope of the invention.

key exchanges using As used herein, the use of "a," "an," or "the" is intended to mean "at least one," unless specifically indicated to the contrary.

All patents, patent applications, publications, and descriptions mentioned herein are incorporated by reference in their entirety for all purposes. None is admitted to be prior art.

What is claimed is:

1. A method for performing a privacy-preserving multi-party computation, the method comprising performing, by a sender device:
    generating a first private key d using a random number generator;
    generating a first public key c using a cryptographic function;
    sending the first public key c to a receiver device;
    receiving a first value $r_0$ and a second value $r_1$ from the receiver device;
    generating a first key $k_0$ using the first value $r_0$ and a first hash output by operating a hash function H on the second value $r_1$ to obtain a first intermediate result, wherein the cryptographic function operates on the first intermediate result using the first private key d to generate the first key $k_0$, wherein the hash function H corresponds to the cryptographic function;
    generating a second key $k_1$ using the second value $r_1$ and a second hash output by operating the hash function H on the first value $r_0$ to obtain a second intermediate result, wherein the cryptographic function operates on the second intermediate result using the first private key d to generate the second key $k_1$;
    sending an encrypted program to the receiver device, wherein the receiver device executes the encrypted program to generate an encrypted output value;
    receiving the encrypted output value; and
    decrypting the encrypted output value using a corresponding key.

2. The method of claim 1, wherein generating the first public key c using the cryptographic function comprises: raising a value g to a power of d to produce the first public key c.

3. The method of claim 1, wherein the first value $r_0$ is randomly generated by the receiver device using a random number generator.

4. The method of claim 3, wherein the second value $r_1$ is generated by the receiver device, by subtracting a hash output of executing the hash function H on the first value $r_0$ from a value g raised to a power of a randomly generated number a.

5. The method of claim 1, wherein the encrypted program is keyed to either the first value $r_0$ or the second value $r_1$.

6. The method of claim 1, wherein the first public key c raised to a power of a randomly generated number a is equal to one of the first key $k_0$ or the second key $k_1$.

7. The method of claim 1, wherein the hash function H is a random oracle.

8. A system for performing a privacy-preserving multi-party computation, the system comprising:
    one or more processors; and
    a non-transitory computer readable medium storing instructions that, when executed, cause the one or more processors to perform a method comprising:
        generating a first private key d using a random number generator;
        generating a first public key c using a cryptographic function;
        sending the first public key c to a receiver device;
        receiving a first value $r_0$ and a second value $r_1$ from the receiver device;
        generating a first key $k_0$ using the first value $r_0$ and a first hash output by operating a hash function H on the second value $r_1$ to obtain a first intermediate result, wherein the cryptographic function operates on the first intermediate result using the first private key d to generate the first key $k_0$, wherein the hash function H corresponds to the cryptographic function;
        generating a second key $k_1$ using the second value $r_1$ and a second hash output by operating the hash function H on the first value $r_0$ to obtain a second intermediate result, wherein the cryptographic function operates on the second intermediate result using the first private key d to generate the second key $k_1$;
        sending an encrypted program to the receiver device, wherein the receiver device executes the encrypted program to generate an encrypted output value;
        receiving the encrypted output value; and
        decrypting the encrypted output value using a corresponding key.

9. The system of claim 8, wherein generating the first public key c using the cryptographic function comprises: raising a value g to a power of d to produce the first public key c.

10. The system of claim 8, wherein the first value $r_0$ is randomly generated by the receiver device using a random number generator.

11. The system of claim 8, wherein the second value $r_1$ is generated by the receiver device, by subtracting a hash output of executing the hash function H on the first value $r_0$ from a value g raised to a power of a randomly generated number a.

12. The system of claim 8, wherein the encrypted program is keyed to either the first value $r_0$ or the second value $r_1$.

13. The system of claim 8, wherein the first public key c raised to a power of a randomly generated number a is equal to one of the first key $k_0$ or the second key $k_1$.

14. The system of claim 8, wherein the hash function H is a random oracle.

15. A non-transitory computer readable medium storing a plurality of instructions that, when executed, cause a computer system to perform a method comprising:
   generating a first private key d using a random number generator;
   generating a first public key c using a cryptographic function;
   sending the first public key c to a receiver device;
   receiving a first value $r_0$ and a second value $r_1$ from the receiver device;
   generating a first key $k_0$ using the first value $r_0$ and a first hash output by operating a hash function H on the second value $r_1$ to obtain a first intermediate result, wherein the cryptographic function operates on the first intermediate result using the first private key d to generate the first key $k_0$, wherein the hash function H corresponds to the cryptographic function;
   generating a second key $k_1$ using the second value $r_1$ and a second hash output by operating the hash function H on the first value $r_0$ to obtain a second intermediate result, wherein the cryptographic function operates on the second intermediate result using the first private key d to generate the second key $k_1$;
   sending an encrypted program to the receiver device, wherein the receiver device executes the encrypted program to generate an encrypted output value;
   receiving the encrypted output value; and
   decrypting the encrypted output value using a corresponding key.

16. The non-transitory computer readable medium of claim 15, wherein generating the first public key c using the cryptographic function comprises: raising a value g to a power of d to produce the first public key c.

17. The non-transitory computer readable medium of claim 15, wherein the first value $r_0$ is randomly generated by the receiver device using a random number generator.

18. The non-transitory computer readable medium of claim 15, wherein the second value $r_1$ is generated by the receiver device, by subtracting a hash output of executing the hash function H on the first value $r_0$ from a value g raised to a power of a randomly generated number a.

19. The non-transitory computer readable medium of claim 15, wherein the encrypted program is keyed to either the first value $r_0$ or the second value $r_1$.

20. The non-transitory computer readable medium of claim 15, wherein the first public key c raised to a power of a randomly generated number a is equal to one of the first key $k_0$ or the second key $k_1$.

\* \* \* \* \*